United States Patent [19]

Edelen et al.

[11] Patent Number: 5,219,391
[45] Date of Patent: Jun. 15, 1993

[54] TRANSMISSION SHIFTER HAVING AUTOMATIC ADJUSTMENT OF CONTROL PARAMETERS

[75] Inventors: Stephen A. Edelen, Battle Creek, Mich.; Ong Chiau-Chieh, Kokomo, Ind.

[73] Assignee: Eaton Corporation, Cleveland, Ohio

[21] Appl. No.: 802,921

[22] Filed: Dec. 6, 1991

[51] Int. Cl.⁵ .................... F16H 59/00; F16H 35/08
[52] U.S. Cl. .................................. 74/335; 74/402; 74/403; 364/424.1
[58] Field of Search .................. 74/335, 402, 403; 364/424.1

[56] References Cited

U.S. PATENT DOCUMENTS

| | | | |
|---|---|---|---|
| 4,766,774 | 8/1988 | Tamai | 74/335 X |
| 4,817,468 | 4/1989 | Leigh et al. | 74/335 |
| 4,847,767 | 7/1989 | Carton et al. | 364/424.1 |
| 4,873,881 | 10/1989 | Edelen et al. | 74/335 X |
| 4,884,201 | 11/1989 | Sato et al. | 364/424.1 |
| 4,911,031 | 3/1990 | Yoshimura et al. | 74/335 |
| 4,965,730 | 10/1990 | Kurihara et al. | 364/424.1 X |
| 4,998,444 | 3/1991 | Mabee | 74/335 |
| 5,023,789 | 6/1991 | Lampe et al. | 364/424.1 |
| 5,058,014 | 10/1991 | Saitou et al. | 364/424.1 |
| 5,060,158 | 10/1991 | Kono et al. | 364/424.1 |
| 5,075,860 | 12/1991 | Suzuki | 364/424.1 |
| 5,094,115 | 3/1992 | Michihira et al. | 74/335 |
| 5,099,711 | 3/1992 | Langbo et al. | 74/335 X |

Primary Examiner—Leslie A. Braun
Assistant Examiner—David E. Henn
Attorney, Agent, or Firm—C. H. Grace

[57] ABSTRACT

A position-feedback-control servomechanism for shifting the transmission of a vehicle has a control algorithm that adjusts the loop gains in a proportional-integral-differential controller to compensate for manufacturing variations in the apparatus as well as for temperature changes and wear. The resulting control system moves the shifting servomechanism into the selected positions accurately and as quickly as possible without permitting excessive overshooting or resonance.

17 Claims, 12 Drawing Sheets

Y AXIS = SYNCHRONIZING
X AXIS = RAIL SELECTION

| POSITION NUMBER (ADDRESS) OF POINTER | K1, GAIN CONSTANT OF PROPORTIONAL CHANNEL | K2, GAIN CONSTANT OF DIFFERENTIAL CHANNEL |
|---|---|---|
| 0 | 124 | 367 |
| 1 | 128 | 360 |
| 2 | 132 | 353 |
| 3 | 136 | 345 |
| 4 | 140 | 337 |
| 5 | 144 | 330 |
| 6 | 148 | 323 |
| 7 | 152 | 315 |
| 8 | 156 | 307 |
| 9 (MEDIAN) | 160 | 300 |
| 10 | 163 | 295 |
| 11 | 166 | 290 |
| 12 | 169 | 285 |
| 13 | 172 | 280 |
| 14 | 175 | 275 |
| 15 | 178 | 270 |
| 16 | 181 | 265 |
| 17 | 184 | 260 |
| 18 | 187 | 255 |

| 1 TEST# | 2 12/R | 3 R/12 | 4 12/34 | 5 34/56 | 6 56/34 | 7 34/12 | |
|---|---|---|---|---|---|---|---|
| 1 | 11( 9) | 11( 9) | 13( 9) | 12( 9) | 13( 9) | 13( 9) | |
| 2 | 11( 9) | 12( 8) | 11( 7) | 11( 8) | 11( 7) | 11( 7) | |
| 3 | 11( 9) | 12( 7) | 11( 7) | 11( 7) | 11( 6) | 11( 6) | |
| 4 | 11( 9) | 12( 6) | 11( 6) | 11( 7) | 11( 6) | 11( 6) | |
| 5 | 11( 9) | 19( 6) | 11( 6) | 11( 7) | 11( 6) | 11( 6) | |
| 6 | 11( 9) | 11( 9) | 11( 6) | 11( 7) | 11( 6) | 11( 6) | |
| 7 | 11( 9) | 12( 8) | 11( 6) | 11( 7) | 11( 6) | 11( 6) | |
| 8 | 11( 9) | 12( 7) | 11( 6) | 11( 7) | 11( 6) | 11( 6) | |
| 9 | 11( 9) | 12( 6) | 11( 6) | 11( 7) | 11( 6) | 11( 6) | |
| 10 | 11( 9) | 19( 6) | 11( 6) | 11( 7) | 11( 6) | 11( 6) | |
| 11 | 11( 9) | 11( 9) | 11( 6) | 11( 7) | 11( 6) | 11( 6) | |
| 12 | 11( 9) | 12( 8) | 11( 6) | 11( 7) | 11( 6) | 11( 6) | |
| 13 | 11( 9) | 12( 7) | 11( 6) | 11( 7) | 11( 6) | 11( 6) | |
| 14 | 11( 9) | 12( 6) | 11( 6) | 11( 7) | 11( 6) | 11( 6) | FAST |
| 15 | 11( 9) | 16( 6) | 11( 6) | 11( 7) | 11( 6) | 11( 6) | SHIFTER |
| 16 | 11( 9) | 12( 3) | 11( 6) | 11( 7) | 11( 6) | 11( 6) | WITH |
| 17 | 11( 9) | 12( 3) | 11( 6) | 11( 7) | 11( 6) | 11( 6) | ALGORITHM |
| 18 | 11( 9) | 12( 3) | 11( 6) | 11( 7) | 11( 6) | 11( 6) | |
| 19 | 11( 9) | 12( 3) | 11( 6) | 11( 7) | 11( 6) | 11( 6) | |
| 20 | 11( 9) | 12( 3) | 11( 6) | 11( 7) | 11( 6) | 11( 6) | |
| 21 | 11( 9) | 12( 3) | 11( 6) | 11( 7) | 11( 6) | 11( 6) | |
| 22 | 11( 9) | 12( 3) | 11( 6) | 11( 7) | 11( 6) | 11( 6) | |
| 23 | 11( 9) | 12( 3) | 11( 6) | 11( 7) | 11( 6) | 11( 6) | |
| 24 | 11( 9) | 12( 3) | 11( 6) | 11( 7) | 11( 6) | 11( 6) | |
| 25 | 11( 9) | 12( 3) | 11( 6) | 11( 7) | 11( 6) | 11( 6) | |
| 26 | 11( 9) | 12( 3) | 11( 6) | 11( 7) | 11( 6) | 11( 6) | |
| 27 | 11( 9) | 12( 3) | 11( 6) | 11( 7) | 11( 6) | 11( 6) | |
| 28 | 11( 9) | 12( 3) | 11( 6) | 11( 7) | 11( 6) | 11( 6) | |
| 29 | 11( 9) | 12( 3) | 11( 6) | 11( 7) | 11( 6) | 11( 6) | |
| 30 | 11( 9) | 12( 3) | 11( 6) | 11( 7) | 11( 6) | 11( 6) | |
| 31 | 11( 9) | 12( 3) | 11( 6) | 11( 7) | 11( 6) | 11( 6) | |
| 32 | 11( 9) | 12( 3) | 11( 6) | 11( 7) | 11( 6) | 11( 6) | |
| 33 | 11( 9) | 12( 3) | 11( 6) | 11( 7) | 11( 6) | 11( 6) | |
| 34 | 11( 9) | 12( 3) | 11( 6) | 11( 7) | 11( 6) | 11( 6) | |
| AV | 11.00 | 12.44 | 11.06 | 11.03 | 11.06 | 11.06 | 11.28 |
| SD | 0.00 | 1.83 | 0.34 | 0.17 | 0.35 | 0.35 | 1.93 |

```
SHIFTER   : #1 (FAST)
TARGET    : +/-9 (7 FOR 5/6)
OS.DELTA  : +/-6 (4 FOR 5/6)
SPEED     : 4    (3 FOR 5/6)
MEMO      : RECORDED FROM 1ST SHIFT
```

| | | | | | | | |
|---|---|---|---|---|---|---|---|
| AV-5: | 11.00 | 12.31 | 11.00 | 11.00 | 11.00 | 11.00 | 11.22 |
| SD-5: | 0.00 | 1.51 | 0.00 | 0.00 | 0.00 | 0.00 | 1.51 |

AVG. AFTER 5TH TIME
STD. DEV.

FIG. 8

| 1 TEST# | 2 12/R | 3 R/12 | 4 12/34 | 5 34/56 | 6 56/34 | 7 34/12 | |
|---|---|---|---|---|---|---|---|
| 1 | 12( 9) | 14( 9) | 14( 9) | 14( 9) | 14( 9) | 14( 9) | |
| 2 | 12( 9) | 12( 9) | 15( 9) | 12( 9) | 14( 9) | 14( 9) | |
| 3 | 12( 9) | 13( 9) | 14( 9) | 12( 9) | 14( 9) | 15( 9) | |
| 4 | 12( 9) | 13( 9) | 15( 9) | 12( 9) | 14( 9) | 14( 9) | |
| 5 | 12( 9) | 13( 9) | 14( 9) | 13( 9) | 14( 9) | 14( 9) | |
| 6 | 12( 9) | 12( 9) | 14( 9) | 11( 9) | 14( 9) | 13( 9) | |
| 7 | 12( 9) | 12( 9) | 14( 9) | 11( 9) | 14( 9) | 13( 9) | |
| 8 | 12( 9) | 12( 9) | 14( 9) | 12( 9) | 14( 9) | 13( 9) | |
| 9 | 12( 9) | 12( 9) | 14( 9) | 12( 9) | 13( 9) | 14( 9) | |
| 10 | 12( 9) | 13( 9) | 14( 9) | 12( 9) | 14( 9) | 14( 9) | |
| 11 | 12( 9) | 12( 9) | 14( 9) | 12( 9) | 14( 9) | 14( 9) | |
| 12 | 12( 9) | 12( 9) | 14( 9) | 13( 9) | 14( 9) | 14( 9) | |
| 13 | 12( 9) | 21( 9) | 14( 9) | 12( 9) | 14( 9) | 14( 9) | |
| 14 | 12( 9) | 12( 9) | 14( 9) | 12( 9) | 13( 9) | 13( 9) | FAST |
| 15 | 12( 9) | 12( 9) | 14( 9) | 12( 9) | 14( 9) | 14( 9) | SHIFTER |
| 16 | 12( 9) | 12( 9) | 14( 9) | 12( 9) | 14( 9) | 13( 9) | WITHOUT |
| 17 | 12( 9) | 12( 9) | 14( 9) | 12( 9) | 14( 9) | 13( 9) | ALGORITHM |
| 18 | 12( 9) | 12( 9) | 14( 9) | 12( 9) | 14( 9) | 14( 9) | |
| 19 | 12( 9) | 12( 9) | 14( 9) | 12( 9) | 14( 9) | 13( 9) | |
| 20 | 12( 9) | 12( 9) | 14( 9) | 12( 9) | 15( 9) | 13( 9) | |
| 21 | 12( 9) | 12( 9) | 13( 9) | 12( 9) | 14( 9) | 13( 9) | |
| 22 | 12( 9) | 12( 9) | 14( 9) | 12( 9) | 14( 9) | 13( 9) | |
| 23 | 12( 9) | 12( 9) | 14( 9) | 12( 9) | 14( 9) | 14( 9) | |
| 24 | 12( 9) | 12( 9) | 14( 9) | 12( 9) | 14( 9) | 13( 9) | |
| 25 | 12( 9) | 12( 9) | 14( 9) | 12( 9) | 14( 9) | 13( 9) | |
| 26 | 12( 9) | 12( 9) | 14( 9) | 12( 9) | 14( 9) | 13( 9) | |
| 27 | 12( 9) | 12( 9) | 13( 9) | 12( 9) | 14( 9) | 13( 9) | |
| 28 | 12( 9) | 12( 9) | 14( 9) | 12( 9) | 15( 9) | 14( 9) | |
| 29 | 12( 9) | 12( 9) | 14( 9) | 12( 9) | 14( 9) | 14( 9) | |
| 30 | 12( 9) | 12( 9) | 14( 9) | 12( 9) | 14( 9) | 13( 9) | |
| 31 | 12( 9) | 12( 9) | 14( 9) | 12( 9) | 14( 9) | 13( 9) | |
| 32 | 12( 9) | 12( 9) | 14( 9) | 12( 9) | 14( 9) | 13( 9) | |
| 33 | 12( 9) | 12( 9) | 14( 9) | 12( 9) | | | |
| AV | 12.00 | 12.45 | 14.00 | 12.06 | 14.00 | 13.50 | 13.00 |
| SD | 0.00 | 1.60 | 0.35 | 0.50 | 0.36 | 0.57 | 1.84 |

```
SHIFTER   : #1 (FAST)
TARGET    : +/- 9 (7 FOR 5/6)
OS_DELTA  : +/- 6 (4 FOR 5/6)
SPEED     : 4    (3 FOR 5/6)
MEMO      : RECORDED FROM 1ST SHIFT
```

| | | | | | | | |
|---|---|---|---|---|---|---|---|
| AV-5: | 12.00 | 12.36 | 13.93 | 11.96 | 14.00 | 13.37 | 12.94 |
| SD-5: | 0.00 | 1.70 | 0.26 | 0.33 | 0.39 | 0.49 | 1.87 |

AVG.
STD. DEV.

FIG. 9

| 1 TEST# | 2 12/R | 3 R/12 | 4 12/34 | 5 34/56 | 6 56/34 | 7 34/12 | |
|---|---|---|---|---|---|---|---|
| 1 | 12(9) | 11(9) | 10(9) | 21(9) | 11(9) | 10(9) | |
| 2 | 12(9) | 13(8) | 11(9) | 12(13) | 12(9) | 10(9) | |
| 3 | 12(9) | 11(7) | 11(9) | 12(13) | 12(9) | 10(9) | |
| 4 | 11(9) | 13(7) | 10(9) | 12(13) | 12(9) | 10(9) | |
| 5 | 12(9) | 12(6) | 11(9) | 12(13) | 13(9) | 10(9) | |
| 6 | 12(9) | 12(7) | 10(9) | 12(13) | 12(9) | 10(9) | |
| 7 | 12(9) | 12(6) | 11(9) | 12(13) | 12(9) | 10(9) | |
| 8 | 12(9) | 12(7) | 11(9) | 12(13) | 12(9) | 10(9) | |
| 9 | 12(9) | 11(6) | 11(9) | 12(13) | 12(9) | 10(9) | |
| 10 | 12(9) | 12(7) | 10(9) | 12(13) | 12(9) | 10(9) | |
| 11 | 12(9) | 11(6) | 11(9) | 12(13) | 12(9) | 10(9) | |
| 12 | 12(9) | 11(7) | 11(9) | 12(13) | 12(9) | 10(9) | |
| 13 | 12(9) | 11(7) | 11(9) | 12(13) | 12(8) | 10(9) | |
| 14 | 12(9) | 12(7) | 10(9) | 12(13) | 12(8) | 10(9) | SLOW |
| 15 | 12(9) | 11(6) | 11(9) | 12(13) | 12(8) | 10(9) | SHIFTER |
| 16 | 12(9) | 11(7) | 11(9) | 12(13) | 12(8) | 10(9) | WITH |
| 17 | 12(9) | 12(7) | 11(9) | 12(13) | 12(8) | 10(9) | ALGORITHM |
| 18 | 12(9) | 11(6) | 11(9) | 12(13) | 12(8) | 10(9) | |
| 19 | 12(9) | 11(7) | 11(9) | 12(13) | 12(8) | 10(9) | |
| 20 | 12(9) | 11(7) | 11(9) | 12(13) | 12(8) | 10(9) | |
| 21 | 12(9) | 12(7) | 10(9) | 12(13) | 12(8) | 10(9) | |
| 22 | 12(9) | 12(6) | 11(9) | 12(13) | 12(8) | 10(9) | |
| 23 | 12(9) | 11(7) | 11(9) | 12(14) | 12(8) | 10(9) | |
| 24 | 12(9) | 12(7) | 10(9) | 12(14) | 12(8) | 10(9) | |
| 25 | 12(9) | 12(6) | 11(9) | 11(14) | 12(8) | 10(9) | |
| 26 | 12(9) | 11(7) | 11(9) | 12(14) | 12(8) | 10(9) | |
| 27 | 12(9) | 11(7) | 11(9) | 11(14) | 12(8) | 10(9) | |
| 28 | 12(9) | 12(7) | 11(9) | 12(14) | 12(8) | 11(9) | |
| 29 | 12(9) | 11(6) | 11(9) | 12(14) | 12(8) | 10(9) | |
| 30 | 12(9) | 12(7) | 11(9) | 12(14) | 12(8) | 10(9) | |
| 31 | 12(9) | 12(6) | 11(9) | 12(14) | 12(8) | 11(9) | |
| 32 | 12(9) | 12(7) | 10(9) | 12(14) | 12(8) | 10(9) | |
| 33 | 12(9) | 12(6) | 11(9) | 12(13) | 12(8) | 10(9) | |
| 34 | 12(9) | 11(7) | 11(9) | | | | |
| AV | 11.97 | 11.59 | 10.76 | 12.21 | 12.00 | 10.06 | 11.43 |
| SD | 0.17 | 0.61 | 0.43 | 1.60 | 0.25 | 0.24 | 1.80 |

SHIFTER    : #2(SLOW)
TARGET     : +/- 9 (6 FOR 5/6)
OS_DELTA   : +/- 6 (4 FOR 5/6)
SPEED      : 4    (3 FOR 5/6)
MEMO       : RECORDED FROM 1ST SHIFT

| | | | | | | | |
|---|---|---|---|---|---|---|---|
| AV-5: | 12.00 | 11.52 | 10.79 | 11.93 | 12.00 | 10.07 | 11.39 |
| SD-5: | 0.00 | 0.51 | 0.41 | 0.26 | 0.00 | 0.26 | 0.75 |

AVG. AFTER 5TH TIME
STD. DEV.

FIG. 10

| 1 TEST# | 2 12/R | 3 R/12 | 4 12/34 | 5 34/56 | 6 56/34 | 7 34/12 | |
|---|---|---|---|---|---|---|---|
| 1 | 13(9) | 12(9) | 12(9) | 14(9) | 12(9) | 11(9) | |
| 2 | 13(9) | 12(9) | 12(9) | 14(9) | 13(9) | 11(9) | |
| 3 | 13(9) | 12(9) | 12(9) | 14(9) | 12(9) | 11(9) | |
| 4 | 13(9) | 12(9) | 12(9) | 14(9) | 12(9) | 11(9) | |
| 5 | 13(9) | 12(9) | 11(9) | 14(9) | 12(9) | 11(9) | |
| 6 | 13(9) | 12(9) | 12(9) | 14(9) | 12(9) | 11(9) | |
| 7 | 13(9) | 12(9) | 12(9) | 14(9) | 12(9) | 11(9) | |
| 8 | 13(9) | 12(9) | 12(9) | 14(9) | 12(9) | 11(9) | |
| 9 | 13(9) | 12(9) | 12(9) | 14(9) | 12(9) | 11(9) | |
| 10 | 13(9) | 12(9) | 12(9) | 14(9) | 12(9) | 11(9) | |
| 11 | 13(9) | 12(9) | 11(9) | 14(9) | 12(9) | 11(9) | |
| 12 | 13(9) | 12(9) | 11(9) | 14(9) | 12(9) | 11(9) | |
| 13 | 13(9) | 12(9) | 12(9) | 14(9) | 12(9) | 11(9) | SLOW |
| 14 | 13(9) | 12(9) | 11(9) | 14(9) | 12(9) | 11(9) | FAST |
| 15 | 13(9) | 12(9) | 12(9) | 14(9) | 12(9) | 11(9) | SHIFTER |
| 16 | 13(9) | 12(9) | 12(9) | 14(9) | 12(9) | 11(9) | WITHOUT |
| 17 | 13(9) | 12(9) | 12(9) | 14(9) | 12(9) | 11(9) | ALGORITHM |
| 18 | 13(9) | 12(9) | 12(9) | 14(9) | 12(9) | 11(9) | |
| 19 | 13(9) | 12(9) | 12(9) | 14(9) | 12(9) | 11(9) | |
| 20 | 13(9) | 12(9) | 12(9) | 14(9) | 13(9) | 11(9) | |
| 21 | 13(9) | 12(9) | 12(9) | 14(9) | 12(9) | 11(9) | |
| 22 | 13(9) | 12(9) | 12(9) | 14(9) | 12(9) | 11(9) | |
| 23 | 13(9) | 12(9) | 12(9) | 14(9) | 12(9) | 11(9) | |
| 24 | 13(9) | 12(9) | 11(9) | 14(9) | 12(9) | 11(9) | |
| 25 | 13(9) | 12(9) | 11(9) | 14(9) | 12(9) | 11(9) | |
| 26 | 13(9) | 12(9) | 12(9) | 14(9) | 13(9) | 11(9) | |
| 27 | 13(9) | 12(9) | 12(9) | 14(9) | 12(9) | 11(9) | |
| 28 | 13(9) | 12(9) | 12(9) | 14(9) | 13(9) | 11(9) | |
| 29 | 13(9) | 12(9) | 12(9) | 14(9) | 12(9) | 11(9) | |
| 30 | 13(9) | 12(9) | 12(9) | 14(9) | 12(9) | 11(9) | |
| 31 | 13(9) | 12(9) | 12(9) | 14(9) | 12(9) | 11(9) | |
| 32 | 13(9) | 12(9) | 12(9) | 14(9) | 12(9) | 11(9) | |
| 33 | 13(9) | 12(9) | 12(9) | 14(9) | 13(9) | 11(9) | |
| 34 | 13(9) | 12(9) | 12(9) | | | | |
| AV | 13.00 | 12.00 | 11.82 | 14.00 | 12.15 | 11.00 | 12.33 |
| SD | 0.00 | 0.00 | 0.39 | 0.00 | 0.36 | 0.00 | 0.53 |

```
SHIFTER   : #2(SLOW)
TARGET    : +/- 9 (6 FOR 5/6)
OS_DELTA  : +/- 6 (4 FOR 5/6)
SPEED     : 4     (3 FOR 5/6)
MEMO      : RECORDED FROM 1ST SHIFT
```

| | | | | | | | |
|---|---|---|---|---|---|---|---|
| AV-5: | 13.00 | 12.00 | 11.83 | 14.00 | 12.14 | 11.00 | 12.33 |
| SD-5: | 0.00 | 0.00 | 0.38 | 0.00 | 0.36 | 0.00 | 0.52 |

AVG.
STD. DEV.

FIG. 11

ADAPTIVE COMPENSATION EFFECTIVENESS  DATE: 27-OCT.-87
                                    DISC: ALGORITHM
                                    FILE: MFGCOMP
HYPOTHESIS 1                        PROJ: R-656

$H_o1$: ADAPTIVE ALGORITHM DOESN'T AFFECT CONSISTENCY BETWEEN UNITS
$H_a1$: ADAPTIVE ALGORITHM IMPROVES CONSISTENCY BETWEEN UNITS $$\text{*F-TEST} = \frac{nx \times Sxmfg^2/(ny-1)}{ny \times Symfg^2/(y2-1)} = 46.07$$

nx = 2
ny = 2
SXmfg = 0.53
SYmfg = 0.58

P-VALUE    $F1,1,.95,$ =   161.4 ; $F1,1,.90$ = 39.86

HYPOTHESIS 2

$H_o2$: ADAPTIVE ALGORITHM DOESN'T AFFECT CONSISTENCY BETWEEN SHIFTS
$H_a2$: ADAPTIVE ALGORITHM IMPROVES CONSISTENCY BETWEEN SHIFTS $$\text{*F-TEST} = \frac{nx \times Sxshf^2/(ny-1)}{ny \times Syshf^2/(ny-1)} = 1.03$$

nx = 2
ny = 2
Sxshf = 0.49
Syshf = 0.48

ASSUMES MEANS ARE ABOUT THE SAME

P-VALUE    $F1,1,.95$ =    161.4 ; $F1,1,.90$ = 39.86

HYPOTHESIS 3

$H_o3$: ADAPTIVE ALGORITHM DOESN'T CHANGE SHIFT TIMES
$H_a3$: ADAPTIVE ALGORITHM IMPROVES SHIFT TIMES $$\frac{(X-Y)-(Ux-Uy)}{SQRT((n1-2)Sx^2+(Ny-1)*Sy^2)/(Nx+Ny-2))} = \frac{0.443}{0.810} < t_{2,a}$$

DEGREES OF FREEDOM = 2+2-2    t STATISTIC    $0.547 < t_{2,a}$ nx = 2     Xavg = 11.80    SX = 0.93
ny = 2     Yavg = 11.35    SY = 0.66

P-VALUE    $t\,2,.60,$ = .289    ; $t\,2,.90,$ = .816

CONCLUSIONS:
**********
1. ACCEPT $H_a1$: COMPENSATION IMPROVES CONSISTENCY BETWEEN UNITS
   CONFIDENCE LEVEL IS ROUGHLY 90%
2. REJECT $H_a2$: COMPENSATION DOESN'T IMPROVE CONSISTENCY BETWEEN SHIFTS
3. ACCEPT $H_a3$: COMPENSATION DOES IMPROVE SHIFT TIMES
   CONFIDENCE LEVEL IS BETWEEN 60% AND 75%

FIG. 12

DATA: POPULATION "ONE", WITHOUT MANUFACTURING COMPENSATION
---
EACH ENTRY REPRESENTS AN AVERAGE OF 25 SHIFTS

| n | 12-R | R-12 | 12-34 | 34-56 | 56-34 | 34-12 | $\overline{X}_{volt,j}$ | $S_{Xvolt,j}$ |
|---|------|------|-------|-------|-------|-------|------|--------|
| 1 | 11.00 | 11.00 | 12.44 | 11.06 | 11.06 | 11.03 | 11.3 | 0.526 |
| 2 | 13.00 | 12.00 | 11.82 | 14.00 | 12.15 | 11.00 | 12.3 | 0.949 |

AVER. $\overline{X}$ = 11.80
$S_{Xmfg}$ = 0.53
****

| | X1 | X2 | X3 | X4 | X5 | X6 | | |
|---|----|----|----|----|----|----|---|---|
| $\overline{X}_i$ | 12.00 | 11.50 | 12.13 | 12.53 | 11.61 | 11.02 | $\overline{X}$ = | 11.80 |
| $S_{Xshf,i}$ | 1.00 | 0.50 | 0.31 | 1.47 | 0.54 | 0.01 | $S_{Xshf}$ = | 0.49 |

****
STANDARD DEVIATION FOR ENTIRE POPULATION       0.93
MAXIMUM SHIFT TIME IF THE POPULATION IS NORMAL  14.6
(3 SIGMA)                                       ****

---
POPULATION "TWO", WITH MANUFACTURING COMPENSATION
---
EACH ENTRY REPRESENTS AN AVERAGE OF 25 SHIFTS

| n | 12-R | R-12 | 12-34 | 34-56 | 56-34 | 34-12 | $\overline{X}_{unit,j}$ | $S_{Xunit,j}$ |
|---|------|------|-------|-------|-------|-------|------|--------|
| 1 | 11.00 | 12.44 | 11.06 | 11.03 | 11.06 | 11.06 | 11.3 | 0.521 |
| 2 | 11.97 | 11.59 | 10.76 | 12.21 | 12.00 | 10.06 | 11.4 | 0.772 |

AVER. $\overline{Y}$ = 11.35
$S_{Ymfg}$ = 0.08
****

| | Y1 | Y2 | Y3 | Y4 | Y5 | Y6 | | |
|---|----|----|----|----|----|----|---|---|
| $\overline{Y}_i$ = | 11.49 | 12.02 | 10.91 | 11.62 | 11.53 | 10.56 | $\overline{Y}$ = | 11.35 |
| $S_{Yshf,i}$ | 0.48 | 0.42 | 0.15 | 0.59 | 0.47 | 0.50 | $S_{Yshf}$ = | 0.48 |

****
STANDARD DEVIATION FOR ENTIRE POPULATION       0.66
MAXIMUM SHIFT TIME IF THE POPULATION IS NORMAL  13.3
(3 SIGMA)                                       ****

TRANSMISSION SHIFTER HAVING AUTOMATIC ADJUSTMENT OF CONTROL PARAMETERS

FIELD OF THE INVENTION

The invention relates to closed-loop control systems for shifting the transmissions of vehicles.

SUMMARY OF THE INVENTION

The Problem

A proportional-integral-differential control circuit has been used in prior art to drive a transmission-shifting servomechanism to its various positions. However, the shifting performance has not always been optimum because of manufacturing variations between shift servomechanisms, as well as wear and the extreme temperature variations of an automotive transmission environment ($-40°$ F. to $+300°$ F.) and other variables. Proportional and differential gain constants (in the control circuit) that were chosen for a relatively powerful and low-friction servomechanism resulted in sluggish performance when used with a servomechanism having less power or greater friction. Conversely, choosing the gain constants to be best for an inherently slow servomechanism resulted in overshoot and oscillation in a faster one.

Optimum control constants also depend upon the specific shifting task. For example, the best control constants for shifting from position one to position two are not the same as the best constants for shifting from position two to position three, or even for shifting back from position two to position one.

It has been found that a slower servomechanism works best with a greater proportional gain (acceleration) and a smaller differential gain (dynamic braking) than the gains that are best for a fast servomechanism. At low temperatures, both inherently fast and slow servomechanisms move very slowly.

The Approach of This Invention

For the reasons just described, it is desirable to provide different control constants (parameters) for each servomechanism and for each positioning task, and also to change the constants in response to temperature and wear conditions. An adaptive circuit that monitors and corrects itself is desirable.

By way of example of the invention, first, a matrix (for example, a $2 \times 19$ matrix) of control constants is established, comprising matched sets of, for example, proportional and differential gain constants. (Of course other parameters could be in the matrix instead or in addition). These pairs of constants consist of progressively higher proportional gain values paired with progressively lower differential gain values. A "pointer" for addressing the matrix has nineteen addresses that can be associated with different servomechanism-positioning tasks. Initially the pointer can be placed at a central setting.

Second, a target zone or range is established around each of the target positions. These are zones of acceptable values of final positions for a shift-mechanism member; if the final position of the mechanism member is within the target zone the positioning task is complete. Overshoot within the zone is acceptable.

Third, after the servomechanism performs any positioning task it critiques its own performance and improves the system. For example, if the overall shift time is too long it automatically moves the pointer in accordance with predetermined rules that are stored in the program, to reduce the shift time.

OBJECTS OF THE INVENTION

Accordingly, one object of the invention is to provide a transmission control system having various system parameters (for example, proportional, integral and differential gains), some of which are altered in accordance with the recent performance of the servomechanism in shifting the transmission.

Another object is to provide a transmission control system in which the proportional and differential gains are automatically altered to improve servomechanism performance.

Another object is to provide a control system for shifting a transmission in which a matrix is established of matched sets of proportional and differential gain constants, and in which an appropriate set is selected for use based upon the recent history of shift performance.

Another object is to provide a control system for shifting a transmission in which a central value of proportional gain constant is matched in a set with a central value of differential gain constant, and in which a smaller-than-central value of proportional gain constant is matched in a set with a larger-than-central value of differential gain constant, and in which a larger-than-central value of proportional gain constant is matched with a smaller-than-central value of differential gain constant, and the appropriate sets are automatically selected depending upon the shifter's characteristics and the conditions under which the shifter is operating.

Another object is to provide a control system for shifting a transmission, in which an acceptable target zone of positions for the servomechanism is established around each destination position, and in which each final position of the servomechanism is monitored upon shifting, and if it is found to be within the target zone the shift is considered to be complete.

Another object of the invention is to provide a control system for a servomechanism for shifting a transmission in which, if the time to reach the first-encountered boundary of a target zone is excessive, the proportional gain constant of the circuit is increased and the differential gain constant is decreased in order to increase the power available for servomechanism motor acceleration and speed, the amounts of changes in gains being based upon the time required to reach the first-encountered boundary of the target zone.

Another object is to provide a control method and servomechanism apparatus for shifting a transmission in which, if the time to reach the first-encountered boundary of a target zone is acceptable but the overshoot is excessive, the proportional gain constant is reduced and the differential gain constant is increased to reduce oscillation and improve the overall shifting time, the amounts of changes in gains being based upon the amount of overshoot.

Another object is to provide a control system for a servomechanism for shifting a transmission in which, if the length of time to reach the first-encountered boundary of a target zone is acceptable and the amount of overshoot within that zone is acceptable, the proportional gain constant is increased and the differential gain constant is reduced to improve the servomechanism motor's acceleration and speed but without inducing oscillation of the system.

Another object is to provide a control system as above and in which the temperature of the apparatus is sensed and the temperature contributes to the selection of gain constants, and a great enough matrix of gain constants is provided to enable compensation for a wide range of temperatures.

Another object is to provide a control system as above and in which a memory is provided in the adaptive control circuits (and if desired, in temperature responsive circuits) that permits the servomechanism to learn and retain certain constants for future use, for example upon setup.

Other objects are to provide methods for performing the functions of the apparatus described above.

Still more objects will be apparent from the description, drawings, and claims of the invention.

BRIEF DESCRIPTION OF DRAWINGS

FIG. 8 is a table showing the performance of a fast shifter using the invention.

FIG. 9 shows the performance of a fast shifter without the invention.

FIG. 10 shows the performance of a slow shifter using the invention.

FIG. 11 shows the performance of a slow shifter without the invention.

DESCRIPTION OF PREFERRED EMBODIMENTS

A preferred embodiment of the invention can be utilized with, for example, a conventional synchronized mechanical gear-change transmission having an input shaft, a countershaft, and an output shaft. The transmission has six forward speeds ranging in ratio from 9:1 to 1:1 and a reverse speed having a ratio of 9:1. Shifting of the transmission is accomplished by a mechanism shown schematically in FIGS. 1 and 2.

Figure 1:
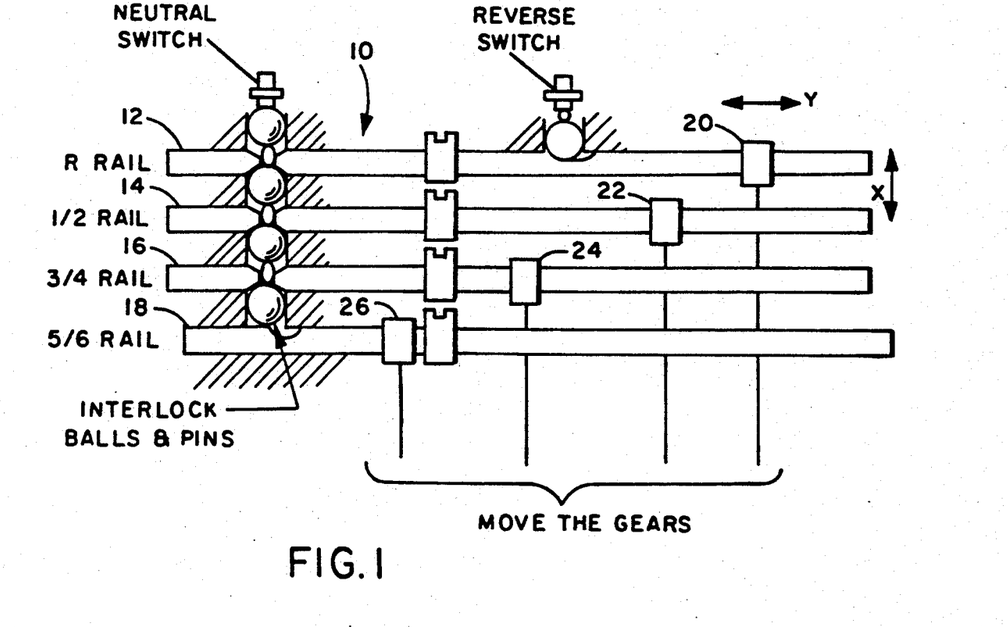
FIG. 1 is a mechanical schematic diagram of a portion of a synchronized mechanical transmission that utilizes the invention.

In FIG. 1, a rail assembly 10 is shown, which includes a reverse-gear rail 12, a 1st/2nd gear rail 14, a 3rd/4th rail 16, and a 5th/6th rail 18. Each of the rails 12, 14, 16, 18 has a lever 20, 22, 24, 26 respectively that slides forward and aft (Y axis), also rotates (X axis) so each lever has four positions.

In the forward position of a lever on the Y axis, the selected gear is reverse, 1, 3 or 5, and in the aft position, it is 2, 4 or 6.

A rail selection actuator (X axis) selects either the reverse rail 12, the 1st/2nd rail 14, the 3rd/4th rail 16, or the 5th/6th rail 18, by rotating the rail's respective lever 20, 22, 24, 26.

Figure 2:
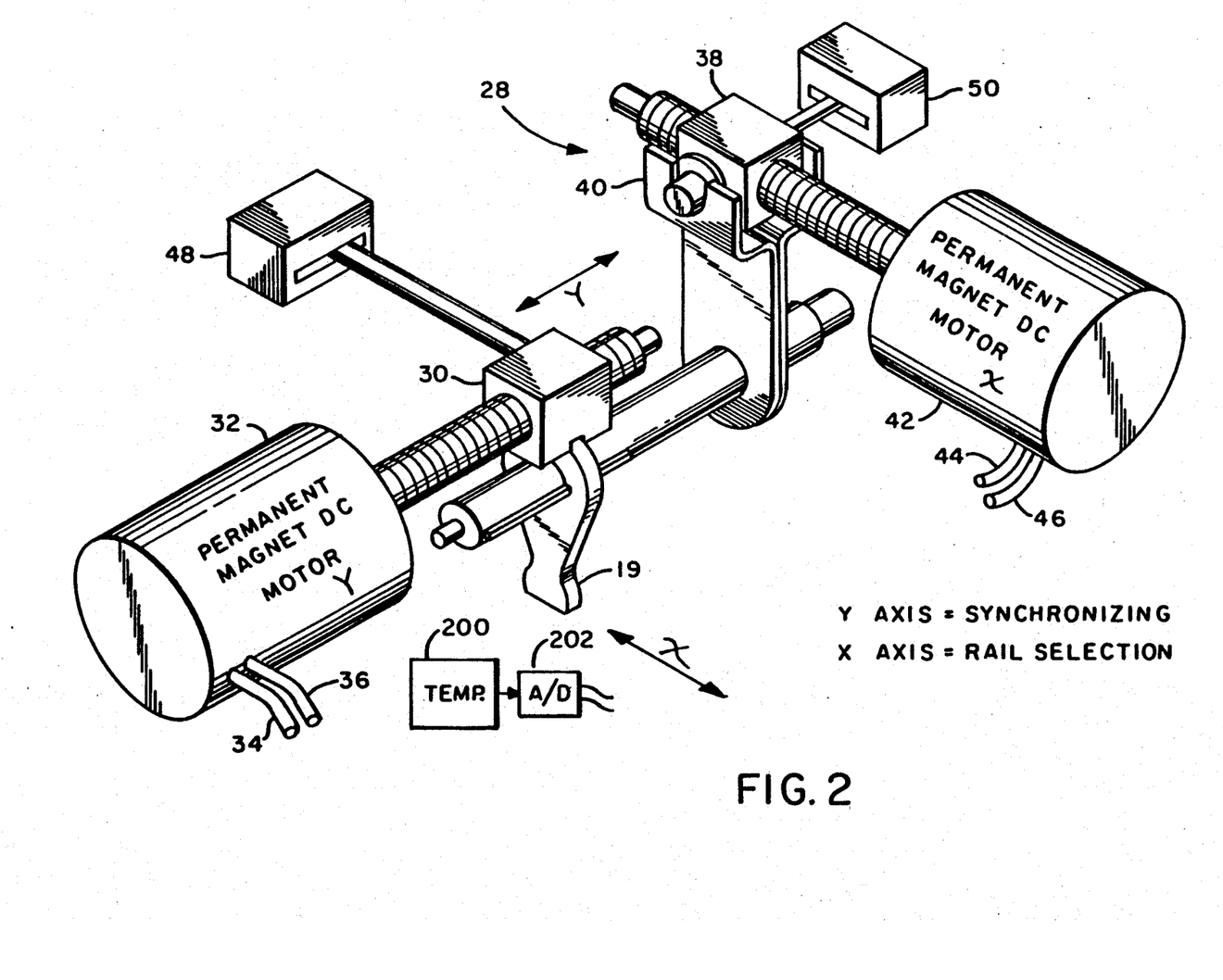
FIG. 2 is a mechanical schematic diagram of a shifter mechanism.

FIG. 2 shows 18, for sliding and rotating its lever 26 along the rail. The reverse, 1st/2nd and 3rd/4th rails are similar. A ball screw mechanism 30, which is driven by a bi-directional permanent-magnet DC motor 32 having electrical leads 34, 36.

Similarly, a ball screw mechanism 38 engages a clevis 40 that is affixed in such a way as to rotate through a small angle, when the ball screw mechanism 38 is operated. See finger 19. The mechanism 38 is driven by a permanent-magnet DC motor 42 that can be energized by electrical leads 44, 46 to rotate in either direction.

Each of the ball screw mechanisms 30, 38, is equipped with a position sensor 48, 50 respectively for providing a position feedback signal to an electronic control unit.

Figure 3:
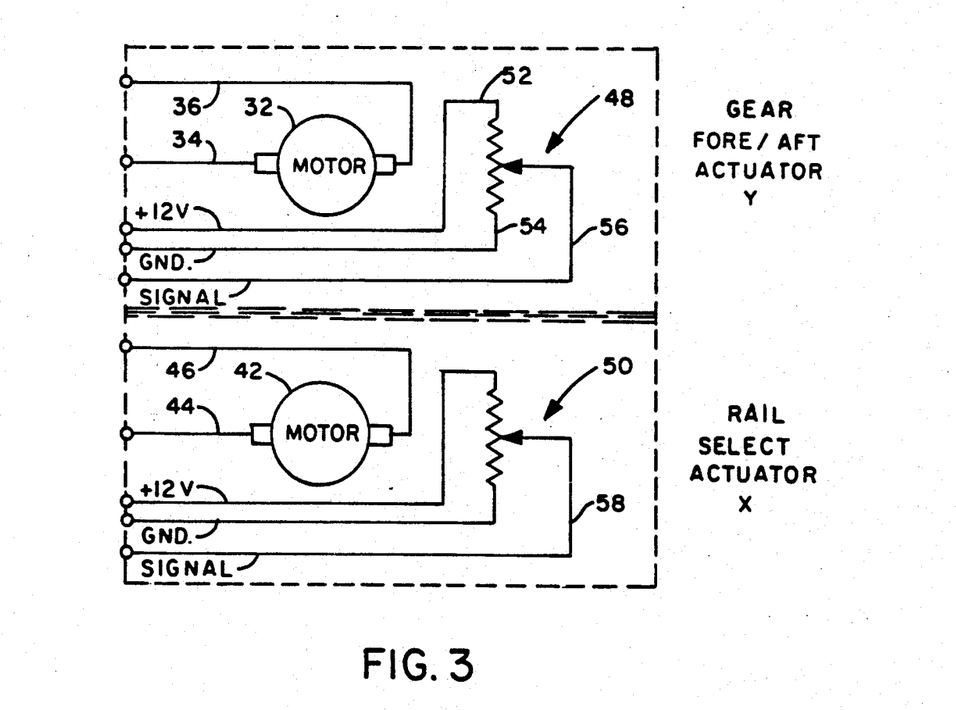
FIG. 3 is a portion of an electrical schematic diagram showing motors and position-feedback sensors for a shift actuator for a transmission.

FIG. 3 is a partial electrical schematic diagram of the motors 32, 42, and their respective position-measuring feedback devices 48, 50. Position-measuring device 48 is a variable resistor having +12 volts applied to one of its terminals 52 and ground potential applied to another terminal 54. An arm 56 of the variable resistor 48 moves in accordance with the position of the ball screw mechanism 30. See finger 19. The voltage on the arm 56 is an indication of the position of the lever 26.

Similarly, the position-sensing device 50 for the rail-selection actuator is a variable resistor. Its movable arm 58 is mechanically connected with the ball screw mechanism 38 so that a DC voltage on the arm 58 is a measure of the position of the ball screw mechanism 38.

Connections of Proportional-Integral-Differential Control Circuit

Figure 4:
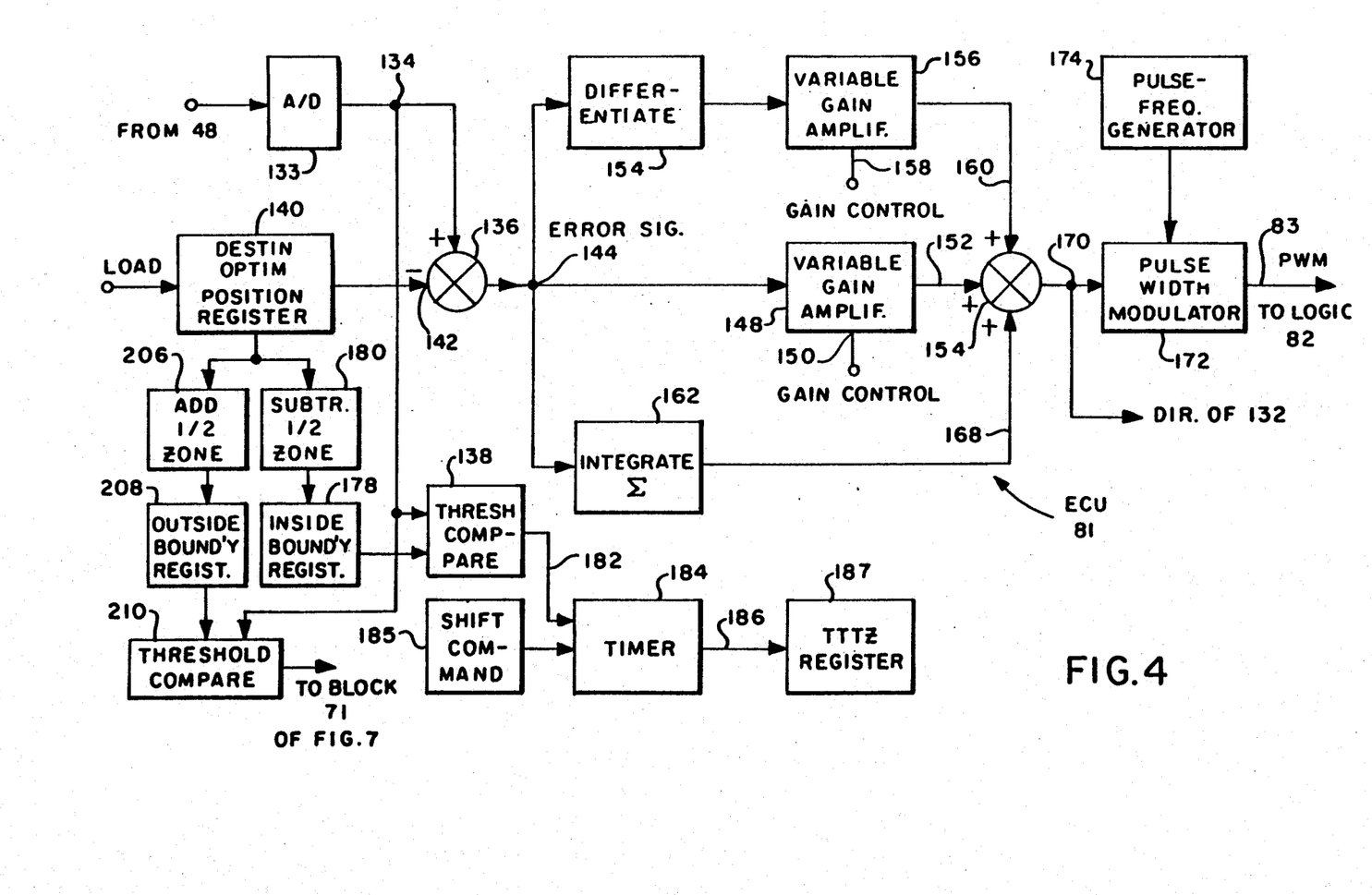
FIG. 4 is a simplified block diagram of the electronic control unit of a position-feedback-control servomechanism for use in shifting a transmission.

In the preferred embodiment being described, an electronic control unit (ECU) 81 controls the shifting mechanism and other devices. The ECU includes a proportional-integral-differential control circuit. Many functions are performed by a microcomputer, which is part of the ECU 81. A microcomputer flow chart (FIG. 7) for performing an algorithm involved in this invention is provided, and only conventional well-known programming techniques are required to practice the invention. Nevertheless, for further clarity an analog version of the functions is shown. FIG. 4 is an analog representation of software in the ECU 81.

The Y-axis position sensor 48 provides a signal at a terminal 134, which goes to a subtractor 136 and a threshold comparator 138. A reference input to the subtractor 136 at a terminal 142 comes from a data register 140 that stores the optimum position (destination) of a shift operation into the forward position of lever 26. The difference between the position signal at terminal 134 and the optimum destination at terminal 142 is an error signal at a terminal 144.

That error signal passes through a variable-gain proportional amplifier 148, whose gain is controlled by a signal at a gain-control terminal 150. The gain is selected from a matrix described below. The amplifier 148 is a proportional channel for processing the error signal. Its output, at a terminal 152, is input to a summer 154.

The error signal at terminal 144 is also processed by a differentiating amplifier 154 that extracts the time-rate-of-change of the error. Its output is processed by a variable-gain amplifier 156 whose gain is under the control of a signal at a terminal 158. Its gain is also selected from the matrix described below. Amplifiers 154 and 156 comprise a differentiating channel whose output goes to a terminal 160 of the summing device 154.

A third channel receiving the error signal of terminal 144 is an integration circuit 162, whose output is at a terminal 168 of the summer 154.

The summer 154 provides an output signal at a terminal 170 that has proportional, differential, and integral components, the first two of which have controllable gain. The signal at 170 goes to a control terminal of a pulse-width modulator (PWM) 172 to control the pulse width of a train of pulses of constant frequency. The pulse frequency is set by a block 174. The pulse-width modulator 172 outputs a PWM signal train at its output terminal 83, which is part of a logic circuit 82 of FIG. 5.

The position signal from sensor 48 at terminal 134 of FIG. 4, is connected also to threshold comparators 138 and 210. Comparator 138 receives another input from an inside-boundary register 178. Register 178 stores the position of the inside boundary of the target zone associated with the destination optimum position. One-half of the target zone's width is deducted from the contents of the destination-optimum-position register 140, in a block 180, to produce data indicative of the position of the inside boundary of the target zone.

Similarly, a block 206 adds half of the target zone's size to the destination and stores an outside boundary in a register 208. Overshooting is detected in the comparator 210 when the position signal at terminal 134 exceeds the outside boundary stored in register 208. The amount of overshoot is conveyed to block 71 in FIG. 7.

The comparator 138 outputs a logic signal at a terminal 182, which is connected to the step terminal of a timer 184. The start terminal of the timer 184 receives a signal from shift-command indicator 185. A group of data terminals 186, at the timer's output, connects to a shifting-time register 187.

Identical analog circuits could be drawn for signals from the other position-feedback devices of the system.

Operation of the Proportional-Integral-Differential Control Circuit

To illustrate the operation of the control loop of FIG. 4, assume that it is desired to shift from fifth gear to sixth gear. The sixth gear position is entered into the destination-optimum-position register 140. Sensor 48 produces a signal at terminal 134 that indicates the actual instantaneous position of the lever 26. The contents of the destination register 140 are subtracted in subtractor 136 from the digitized actual position signal at terminal 134 to produce an error signal at the terminal 144.

The variable-gain proportional amplifier 148 provides a proportional component of error signal at input 152 of the summer 154.

A differentiated version of the error signal is produced by the differentiator 154 and the variable-gain amplifier 156, and that component of signal enters the summer 154.

The error signal at terminal 144 is integrated in the integrator 162 and the result is presented to the summer 154. The output 170 of the summer controls the width of pulses at the output 83 of the pulse-width modulator 172.

Figure 5:
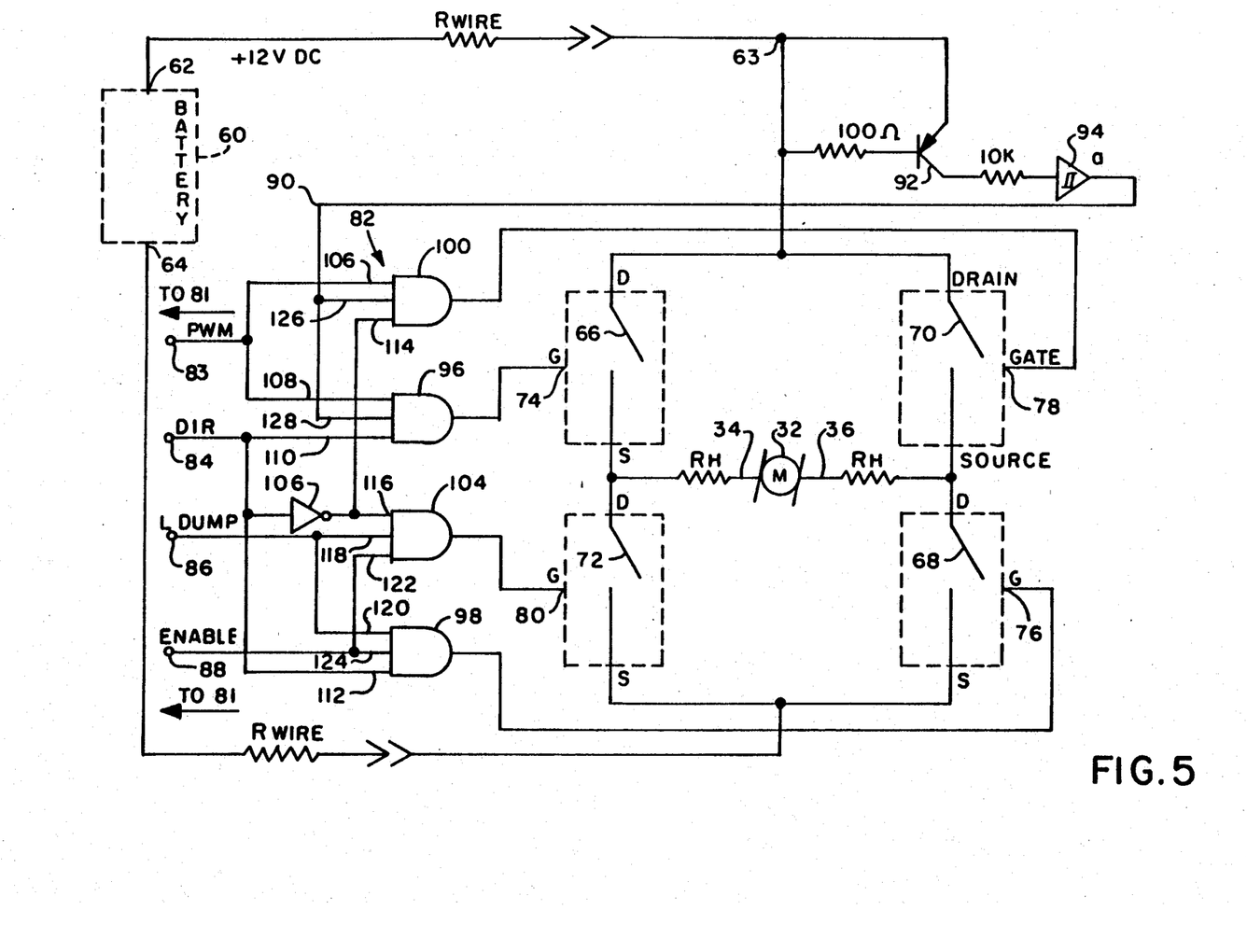
FIG. 5 is a simplified motor-drive-circuit schematic diagram for making connections to a permanent-magnet DC motor that drive a shifter.

The sign of the output from the summer at terminal 170 is utilized to control the direction of rotation of the motor 32 by means of the direction-control input terminal 84 of the logic circuitry 82, as shown in FIG. 5.

Connections of ECU Motor Drive Circuit

In FIG. 5 the motor 32 is shown schematically in a conventional switching circuit that permits reversible operation. A battery 60 provides 12-volt DC power between its positive terminal 62 and its ground terminal 64.

Electronic switches 66, 68, 70, 72 are field-effect transistors, each having a drain, a source and a gate terminal, in which the gate terminal controls the actuation of the switch and conventional load current flows from the drain to the source. The gate terminals are designated 74, 76, 78, 80 respectively.

A logic circuit generally designated 82 controls the operation of the switches 66, 68, 70, 72 in response to commands at its input terminals. These input terminals include a pulse-width-modulation (PWM) terminal 83, a directional terminal 84, an LDUMP terminal 86, and an ENABLE terminal 88.

Another input to the logic circuit 82, at a terminal 90, has a battery-voltage-presence signal. The battery voltage at a terminal 63 is processed by a series-connected transistor 92 and a logic amplifier 94, whose final output voltages are binary logic levels compatible with the logic circuit 82.

The logic circuit 82 comprises four AND gates 96, 98, 100, 104, whose outputs are connected to the gate terminals 74, 76, 78, 80. A logic 1 signal at an AND-gate's output closes the switch to whose gate terminal it is connected.

Each of the AND gates has three inputs. The PWM terminal 83 is connected to input terminals 106, 108 of AND gates 100, 96 respectively. The directional terminal 84 is connected to input terminals 110 and 112 of the AND gates 96, 98 respectively and to the input terminal of inverter 106. The output of inverter 106 is connected to input terminals 114 and 116 of AND gates 100, 104 respectively.

The LDUMP terminal 86 is connected to input terminals 118, 120 of AND gates 104, 98 respectively. The ENABLE terminal 88 is connected to input terminals 122, 124 of AND gates 104, 98 respectively. The battery-sensing terminal 90 of the logic circuit 82 is connected to input terminals 126, 128 of the AND gates 100, 96 respectively.

In FIG. 5, when battery voltage is present at the terminal 63, a logic 1 is applied by amplifier 94 to the AND gates 100 and 96. Absence of battery voltage would block those AND gates and prevent operation of the shift motor 32 in either direction. This is a safety feature.

The ECU 81 is also capable of disabling the motor 32, by applying a logic 0 signal to either the ENABLE terminal 88 or the LDUMP terminal 86. That causes the AND gates 98, 104 to apply logic 0 signals to gate terminals of the switches 68, 72 respectively, so as to prevent the connection of a ground potential to either terminal of the motor 32.

Continuing with FIG. 5, the ECU 81 controls the direction of the operation of the motor 32 by applying a logic 1 signal to the directional terminal 84 when it is desired to move the lever 26 forward. That puts a logic 1 on inputs of the AND gates 96, 98 and a logic 0 (through the inverter 106) on the AND gates 100, 104. Only the forward switches 66 and 68 can then be closed. Conversely, a logic 0 at the directional terminal 84 disables switches 66, 68 and enables the aft-direction switches 70, 72.

Operation of ECU Motor Drive Circuit, etc.

In an example of the operation of the circuit of FIG. 5 the AND gates 96 and 98 are enabled by the direction signal, and the AND gates 100 and 104 are disabled, so switches 70 and 72 cannot be closed. Assuming that battery voltage is present, as indicated by a logic 1 at terminal 90, and that the LDUMP and ENABLE signals at terminals 86 and 88 are logic 1s, the output of AND gate 98 is a logic 1, so that switch 68 is closed.

The output of AND gate 96 is now under the sole control of the logic signal at the PWM terminal 83. The switch 66 receives a pulse-width-modulated signal at its gate terminal 74, having a duty cycle that depends upon the signal at terminal 170 of the summer 154. The switch 66 is therefore alternately opened and closed for a controllable duty cycle that has some average ON time, which controls the average positive voltage applied to terminal 34 of the motor 32. The motor 32 therefore receives electrical input power that varies in accordance with a demand stated at the output of the summer 154.

The motor 32 operates the ball screw mechanism 30 and moves the lever 26 with a controlled speed. As the lever 26 approaches the sixth gear position on the rail 18 it encounters the inside boundary of the target zone, which is stored in register 178 of FIG. 4. The threshold comparator 138 detects that the lever 26 is at the inside boundary and issues a logic 1 signal at terminal 182.

The transit time of lever 26 from the time of issuance of the shift command to the time of arrival at the inside boundary is measured in the timer 184. Timer output information at the register 187 is sent to an algorithm circuit that carries out the algorithm of flow chart FIG. 7 and moves the pointer of FIG. 6 to select appropriate gains for the variable-gain amplifiers 148 and 156. The values of the gain-control signals are stored at the pointer position registers. Thus the gains of the variable-gain amplifiers are adjusted for appropriate speed, overshoot, etc. of the positioning system.

By changing the duty cycle of the PWM signal, the ECU 81 controls the average voltage applied to the motor 32. This compensates for variations of system parameters such as friction in the present invention, and compensates for variations of the battery voltage in a co-pending application, which is assigned to the assignee of the present invention.

In the manner just described, the ECU 81 controls the operation of the motor 32 and movements of the lever 26 in forward and aft directions.

Similar circuits control the motor 42 and motors on other rails.

Flow Chart for Parameter-Adjustment Algorithm

Figure 7:
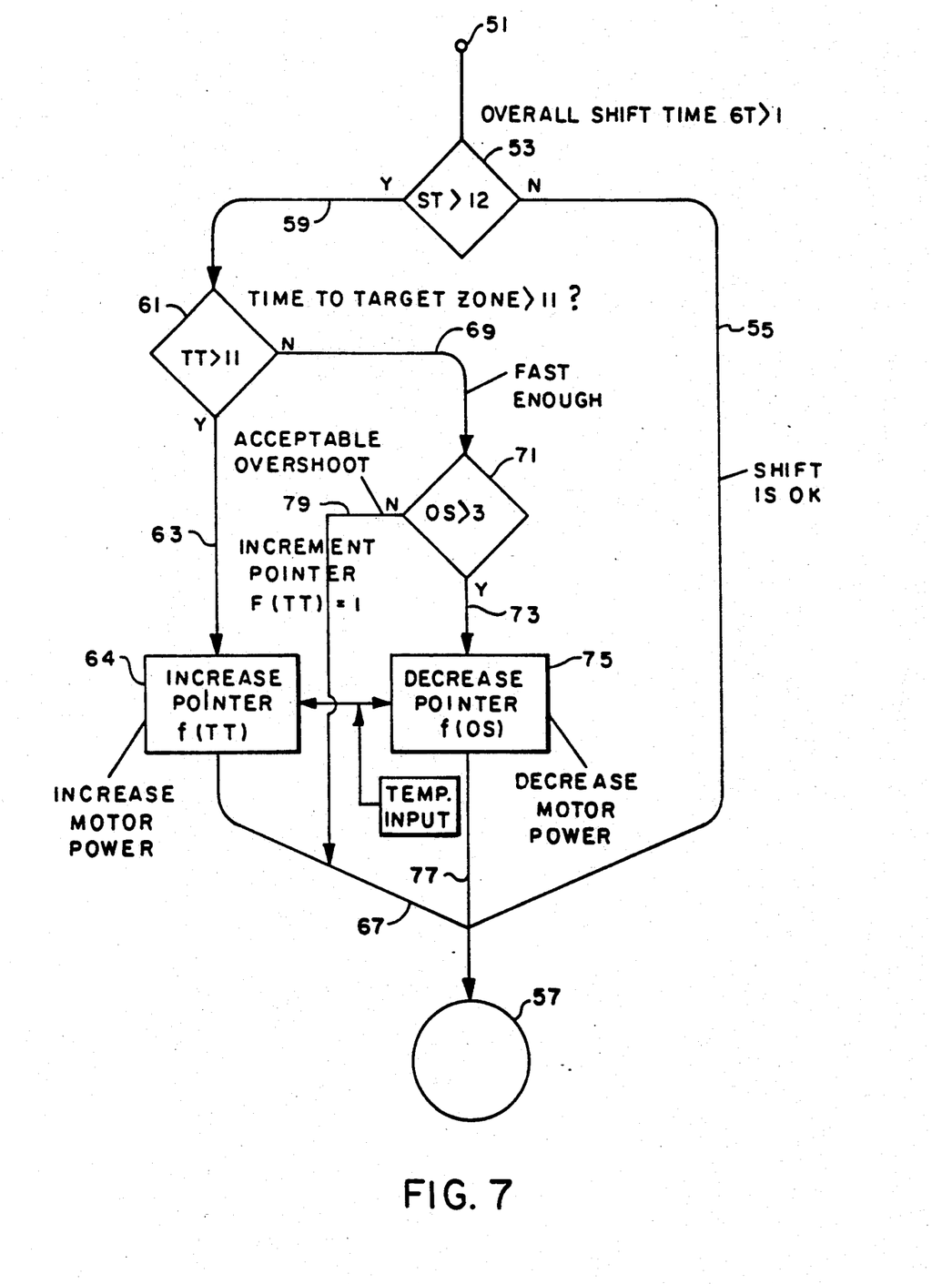
FIG. 7 is a flow chart of an algorithm for adjusting some control parameters of a shift servomechanism.

A flow chart describing the algorithm for adjustment of control parameters (which in this embodiment are gains) is shown in FIG. 7. The program starts at input 51. The time required to perform a shift is measured, and compared with a predetermined reference in block 53. If the shift time (ST) is found to be equal to or less than 12 control loops, the shift performance is satisfactory and the program proceeds on a line 55 to exit the program at 57.

If, however, the shift time is greater than 12, the program proceeds on a line 59 to a block 61 where the time to reach the predetermined target zone (TT) is examined. If the time to reach inside boundary of the target zone is greater than 11 the flow proceeds on a line 63 to a block 65, which commands an increase in the pointer setting. The amount of increase is a function of the time to reach the target zone, increasing with increasing time. At the new position of the pointer the matrix calls for an increase in the proportional gain and a reduction in the differential gain. The power to drive the shifting mechanism will be greater during the next shift. The flow proceeds along a line 67 to the exit 57.

Returning to block 61, if the time to the target zone was not greater than 11, flow proceeds along a line 69 to a block 71. In block 71 the overshoot (from block 210 of FIG. 4) is compared with a reference position to ascertain whether or not it exceeds 3 A/D bits of travel. If it does, flow proceeds along a line 73 to a block 75 where a command is issued to decrease the pointer position by an amount dependent upon the amount of overshoot (OS). That change decreases the motor power. The flow continues along a line 77 to the output 57.

Returning to block 71, if the overshoot was not greater than 3, the flow proceeds along a line 79 to increment the pointer. The flow continues along line 67 to the exit 57.

In this way the system observes and corrects its own performance.

Performance Data

Figure 6:
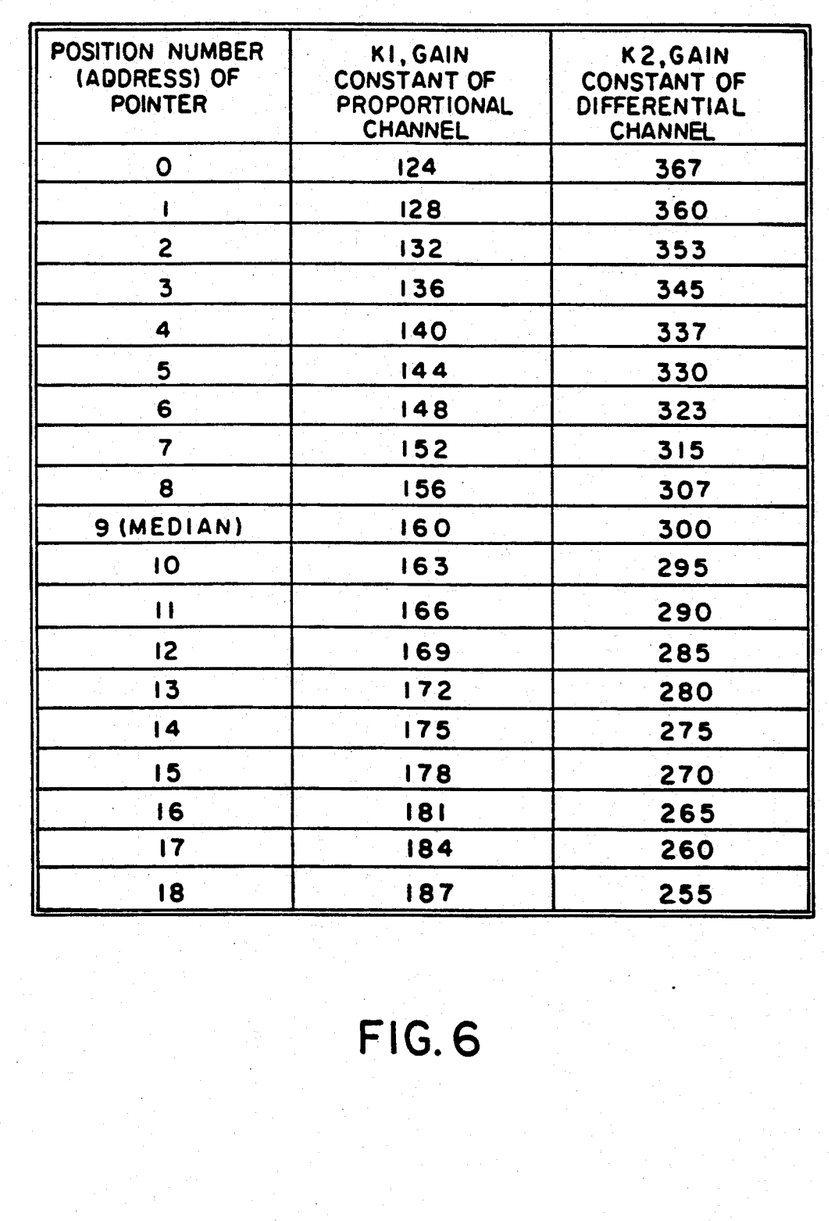
FIG. 6 shows a matrix of pairs of control-circuit constants that are available for selection in differing circumstances.

In FIG. 6 some typical values are shown for the proportional gain and the differential gain for each of the 19 addresses of the parameter matrix. K1 is the proportional gain and K2 is the differential gain. These values were used in the illustrative tests whose results are presented in FIGS. 8-13.

FIGS. 8-11 are data tables whose entries are the times required to perform the shifts, expressed in loops. The number in parentheses following each table entry represents the matrix address of proportional and differential gain values at the time of the shift. Parameter adjustment is exhibited here.

The first column is merely the row number of the table. The second column represents times to shift from 1st/2nd rail to the reverse rail. The third column is for shifts from reverse rail to the 1st/2nd rail. The fourth column is for up-shifts from the 1st/2nd rail to the 3rd/4th rail. The fifth column is for shifts from the 3rd/4th rail to the 5th/6th rail. Column six has downshifts from the 5th/6th rail to the 3rd/4th rail and column seven has shifts from the 3rd/4th rail to the 1st/2nd rail. For all of the data the battery voltage was +12 volts. The information was recorded from the first shift.

FIG. 8 is the performance of a fast shifter using the invented algorithm and its apparatus. The target zone is ±9 units, except for the shift position 5/6 for which the target zone is ±7 units. The overshoot delta is ±6 units, except for the target position 5/6 for which the delta is 4 units. The acceptable speed is 4, except for position 5/6 for which the acceptable speed is 3.

Continuing with FIG. 8, in row A.V. the average shift times are shown for each of the columns 2 through 7, and at the extreme right the average of all of those averages is shown.

In row S.D the standard deviation is shown for the data in each of the columns.

In row AV-5 the average of times for shifting after the fifth time is shown for each of the columns 2-7. At the extreme right of the row AV-5 the average value is shown for the six columns. In row SD-5 the standard deviation is shown for shifts after the fifth shift.

In FIG. 9 similar data are presented for the same fast shifter without benefit of the invented algorithm and its apparatus. The row AV-5 for this situation shows, at the extreme right of the row, the figure 12.94 as the average after the fifth shift of that type. This is longer than the corresponding 11.22 of FIG. 8. The standard deviation of FIG. 8 as shown in the row SD-5 is 1.87 without the algorithm, which compares unfavorably with the standard deviation 1.51 of FIG. 8, which has the benefit of the algorithm.

In FIG. 10 similar data are presented for a slow shifter. The constants in the pointer matrix are the same as those of FIGS. 8 and 9, as are the zone ranges, the overshoot delta ranges, the speed and the battery voltage. In this case the average time for shifting after the fifth shift is 11.39 (see row AV-5). As shown in row SD-5 the standard deviation is 0.75 using the algorithm.

In FIG. 11 the slow shifter is tested without the algorithm. Its average AV-5 after the fifth shift is 12.33 control loops, which compares unfavorably with the 11.39 constrol loops of FIG. 10. The standard deviation shown in FIG. 11 is 0.52 which is somewhat smaller than the 0.75 standard deviation of FIG. 10.

The algorithm reduced the shifting times by about 14% for the fast shifter and by about 8% for the slow shifter.

Figure 12:
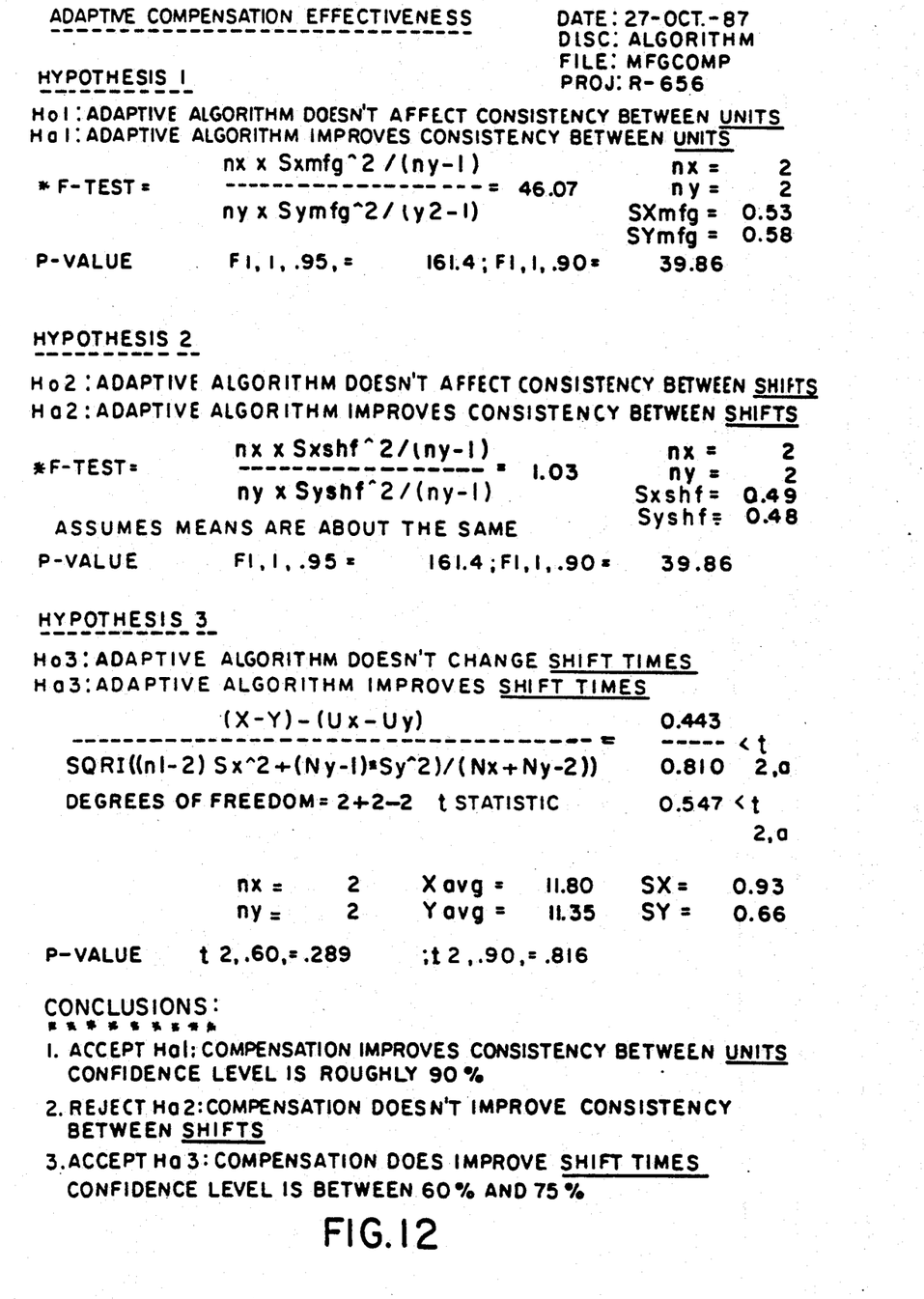
FIG. 12 shows the effect of the invention on the consistency of shifting performance among shifts within a transmission and among different transmissions; it also shows the improvement in shift times.

FIG. 12 shows the effectiveness of the adaptive compensation. A statistical test of whether or not the adaptive algorithm improved consistency between units (i.e. different shifting mechanisms) shows with a 95% confidence level that the compensation does improve consistency.

A statistical F-test shows that a hypothesis (2) that the adaptive algorithm does not improve consistency between shifts of the same unit is rejected.

A third hypothesis, that the compensation reduces shift times, is accepted with a confidence level between 60% and 75%.

Figure 13:
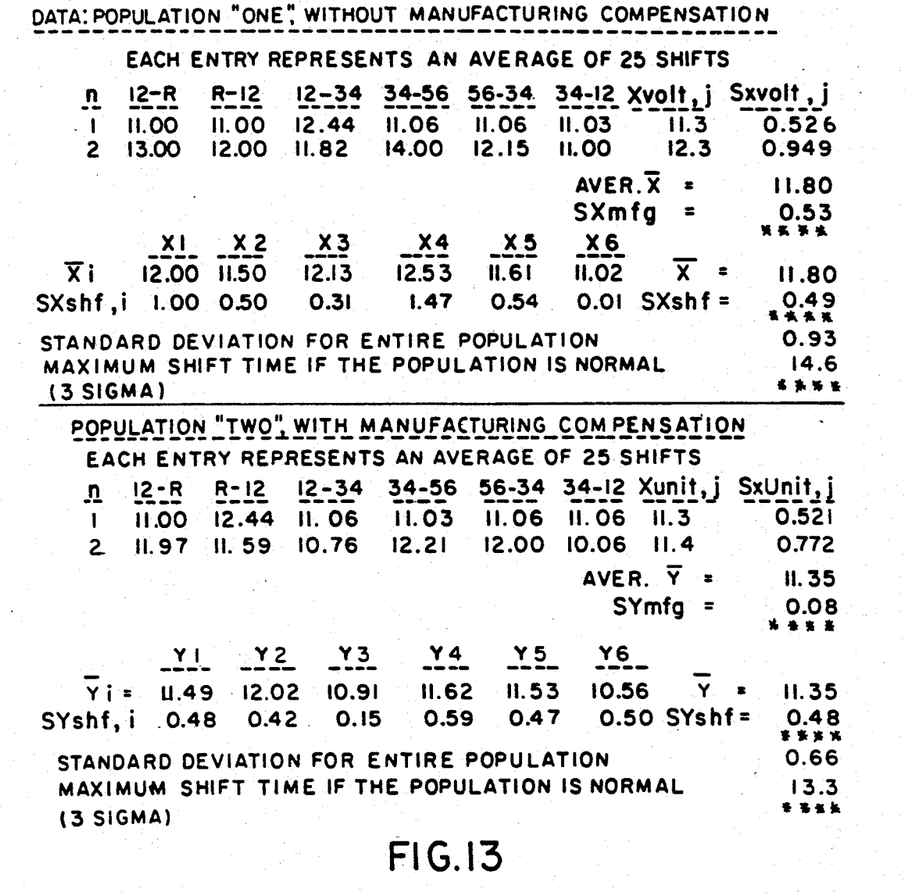
FIG. 13 shows shift times and standard deviations thereof for various shift tasks, both with and without compensation for variations in performance that are caused by manufacturing differences.

FIG. 13 shows a statistical analysis for shifting without compensation for manufacturing differences, and compares it with a statistical analysis for shifting that does have manufacturing compensation. Each entry in the table represents 25 shifts. Columns are as defined in the discussion of FIGS. 8-11 above. The entries in the table are shift times.

The standard deviation without compensation is 0.93, while the standard deviation with compensation is 0.66.

The maximum shift time if the population is normal (three standard deviations) without compensation is 14.6. The maximum shift time with compensation, if the population is normal, is 13.3.

Thus, the manufacturing compensation is shown to reduce the standard deviation by 29% and to reduce the maximum shift time, under certain assumptions, by 9%. This is a significant improvement.

Embodiment Having Pointer Memory

Figure 14:
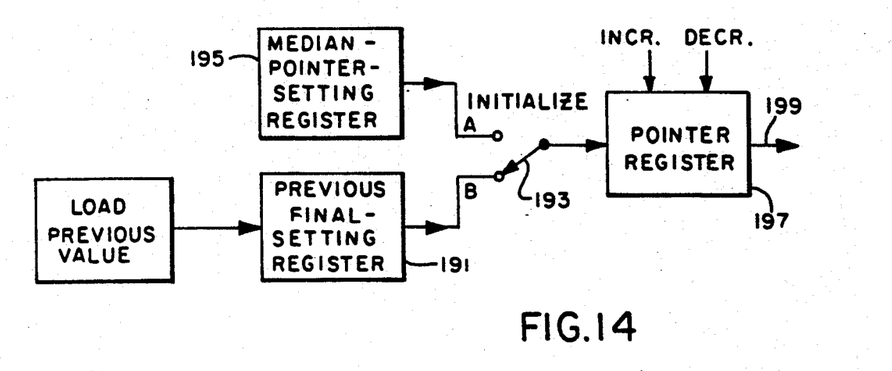
FIG. 14 shows a second embodiment in which a previous final setting of a pointer is stored in memory and used to initialize the pointer's setting upon startup.

In FIG. 14 a simplified block diagram illustrates the functions of a software program in which the final setting of the matrix pointer from a previous operation of the apparatus is stored in a memory and utilized as the starting position of the pointer upon the next startup.

The final gain values from the previous operation of the equipment are loaded into a previous-final-setting register 191. When a selector 193 has selected the mode of operation in which the previous final setting is utilized to initialize the pointer, a median setting register 195 is not utilized.

The pointer register 197 is loaded upon startup by the contents of the previous-final-setting register 191. The pointer register 197 then initializes the pointer 199 at the setting where the pointer was located at the end of the previous operation of the equipment.

OTHER EMBODIMENTS

Still another embodiment has a temperature sensor 200 (FIG. 2) whose signal is digitized in an analog-to-digital converter 202 and sent to a temperature input block 204 of the flow chart FIG. 7. That signal biases the pointer-position functions of blocks 65 and 75 upward and downward respectively to facilitate operation at low temperatures. Alternatively, extreme temperatures could employ ancillary address locations of the matrix.

Although the invention has been illustrated by only a few embodiments, many other forms are possible using its principles. The scope of the invention is defined by the claims.

What is claimed is:

1. A method for shifting a change-gear transmission having a servomechanism for moving a mechanical shifting member along a predetermined path in response to shifting commands (140), a sensor (48) for sensing the position of said shifting member and providing a position signal accordingly, and a feedback control loop (136) having a gain and receiving said position signal from said sensor and driving said shifting member to a commanded destination position, comprising the steps of:
   measuring the elapsed time (184) for said shifting member to traverse said path to reach a predetermined point thereon;
   comparing said elapsed time with a stored time value;
   changing said gain (65, 75, 148, 156) of said feedback control loop if said elapsed time to reach said predetermined point is greater than said stored time value.

2. A method as in claim 1 and wherein said step of changing said gain comprises steps of providing in said control loop at least a proportional channel having a gain and a differential channel having a gain, and increasing said differential channel's gain (156) when said proportional channel's gain (148) is reduced, and reducing said differential channel's gain when said proportional channel's gain is increased.

3. A method as in claim 2 and further comprising steps of:
   establishing a maximum-permissible-overshoot boundary; comparing the overshoot of said shifting member with said overshoot boundary; and if the time to reach said predetermined point is not greater than said threshold time and the overshoot exceeds said overshoot boundary, reducing said proportional gain and increasing said differential gain to reduce said overshoot.

4. A method as in claim 2 and further comprising steps of establishing a maximum-permissible-overshoot boundary; comparing the overshoot of said member with said overshoot boundary, and if the length of time to reach said predetermined point is not greater than said threshold time and said overshoot does not exceed said overshoot boundary, increasing said proportional gain and reducing said differential gain;

whereby to reduce said elapsed time to traverse said path.

5. A method as in claim 1 and further comprising a step before said step of changing said gain, of starting with a predetermined value (195) of said gain, and repeating said steps upon subsequent shifts along said predetermined path, of measuring the elapsed time and changing said gain.

6. A method as in claim 1 and further comprising the steps of:

establishing a target zone (178, 208) of final position for said shifting member, said target zone being defined by position boundaries bracketing said commanded destination position on said path;

comparing said sensed position of said shifting member with said position boundaries;

ceasing the shifting when said shifting member's position is within said target zone.

7. A method as in claim 6 and in which said step of changing said gain comprises changing said gain by an amount (65) that depends upon said elapsed time required to reach, on said path, the first-encountered of said boundaries of said target zone.

8. A method as in claim 1 and further comprising a step of sensing a temperature affecting the shifting performance; and in which said step of changing gain comprises automatically choosing said gain based in part upon said temperature.

9. A method as in claim 1 and further comprising a step of providing a memory; and after said step of changing gain, storing said gain in said memory for use for subsequent shifts along said path.

10. A transmission control system for shifting a change-gear transmission by means of a servomechanism in response to a shifting command, said servomechanism having various system parameters including at least a proportional channel gain and a differential channel gain, comprising:

means for measuring the elapsed shifting time of the transmission control system in performing a shift;

means for comparing said elapsed shifting time with a predetermined stored reference time to determine an error time;

means for changing at least said proportional channel gain and differential channel gain in accordance with said error time prior to a subsequently occurring shift.

11. A transmission control system as in claim 1 and further comprising means for making the amounts of changes of said gains dependent upon the magnitude of said error time.

12. A transmission control system as in claim 1 and further comprising:

a matrix of matched sets of proportional-channel and differential-channel gains;

means for selecting from said matrix a set of proportional and differential gains for subsequent-shift use based upon said error time.

13. A transmission control system as in claim 12 and further comprising:

memory means for storing gain constants that have been automatically selected from said matrix for said subsequent-shift use;

means for saving said stored gain constants during periods of dis-use of the servomechanism, for use when operation of the transmission control system subsequently resumes.

14. A transmission control system as in claim 1 and further comprising:

means for, upon start-up of said transmission control system, utilizing a predetermined stored value of proportional gain that is part of a matched set with a predetermined stored value of differential gain;

means for storing other matched sets comprising proportional gains smaller than said predetermined value of proportional gain, matched in sets with differential gains larger than said predetermined value of differential gain, as well as larger-than-said-predetermined value of proportional gains matched with smaller-than-said-predetermined value of differential gains.

15. A transmission control system as in claim 14 and wherein said servomechanism comprises a shifting member that follows a shifting path in response to said shifting command, and further comprising:

means for monitoring the position of said shifting member;

means for establishing boundaries defining a target zone of positions on said path of said shifting member, said boundaries bracketing a commanded destination on said path of said shifting member;

means for measuring the elapsed time to reach a first-encountered boundary of said target zone as said shifting member moves on said path;

means for storing a predetermined time value corresponding to said path;

means for increasing said proportional gain and decreasing said differential gain if said elapsed time to reach said first-encountered boundary exceeds said predetermined time value.

16. A transmission control system as in claim 15 and further comprising:

means for storing a value of permissible overshoot of said shifting member beyond said commanded destination;

means for measuring the amount of actual overshoot of said shifting member beyond said permissible overshoot value;

means for increasing said proportional gain and reducing said differential gain if said actual overshoot is less than said permissible overshoot value;

whereby to reduce said elapsed shifting time for subsequent shifts.

17. A transmission control system as in claim 1 and further comprising:

means for measuring a temperature affecting the shifting performance of the system;

means for changing said gains in accordance with said temperature.

* * * * *